un009910863B2

United States Patent
Watanabe

(10) Patent No.: US 9,910,863 B2
(45) Date of Patent: Mar. 6, 2018

(54) COMMUNICATION DEVICE FOR SEARCHING FOR PREDETERMINED EXTERNAL DEVICE FROM NETWORK, COMMUNICATION DEVICE CONTROL METHOD, AND RECORDING MEDIUM

(71) Applicant: CANON KABUSHIKI KAISHA, Tokyo (JP)

(72) Inventor: Hitoshi Watanabe, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 230 days.

(21) Appl. No.: 14/738,468

(22) Filed: Jun. 12, 2015

(65) Prior Publication Data
US 2015/0365307 A1  Dec. 17, 2015

(30) Foreign Application Priority Data

Jun. 16, 2014 (JP) ................................. 2014-123607

(51) Int. Cl.
| G06F 15/16 | (2006.01) |
|---|---|
| G06F 17/30 | (2006.01) |
| H04W 8/00 | (2009.01) |
| G06F 21/30 | (2013.01) |
| G06F 21/44 | (2013.01) |
| H04L 12/24 | (2006.01) |
| H04L 29/08 | (2006.01) |
| H04L 29/06 | (2006.01) |
| H04W 12/06 | (2009.01) |
| H04W 84/12 | (2009.01) |
| H04W 4/02 | (2018.01) |

(52) U.S. Cl.
CPC .. *G06F 17/30244* (2013.01); *G06F 17/30312* (2013.01); *G06F 21/305* (2013.01); *G06F 21/44* (2013.01); *H04W 8/005* (2013.01); *G06F 2221/2111* (2013.01); *G06F 2221/2115* (2013.01); *H04L 41/12* (2013.01); *H04L 63/083* (2013.01); *H04L 67/16* (2013.01); *H04W 4/022* (2013.01); *H04W 12/06* (2013.01); *H04W 84/12* (2013.01)

(58) Field of Classification Search
CPC ......... H04L 67/16; H04L 41/12; H04W 8/005
See application file for complete search history.

(56) References Cited

U.S. PATENT DOCUMENTS

| 3,647,974 A * | 3/1972 | Geisler | ................ G08B 19/005 |
| | | | 379/42 |
| 2006/0206592 A1* | 9/2006 | Fujii | ..................... H04W 48/16 |
| | | | 709/220 |

(Continued)

FOREIGN PATENT DOCUMENTS

| JP | 2007-249821 A | 9/2007 |
| JP | 2011-118859 A | 6/2011 |

*Primary Examiner* — Hieu Hoang
(74) *Attorney, Agent, or Firm* — Canon U.S.A., Inc. IP Division

(57) ABSTRACT

A communication device that participates in a network includes a storing control unit that stores images, a search unit that searches for a predetermined external device from the network, a transmission unit that transmits stored images to the external device via the network, a determination unit that determines the frequency of participation in the network, and a changing unit that changes the time for searching for the external device according to determination results of the determination unit.

11 Claims, 7 Drawing Sheets

(56) References Cited

U.S. PATENT DOCUMENTS

| | | | |
|---|---|---|---|
| 2006/0285502 A1* | 12/2006 | Bigioi | H04L 67/14 370/254 |
| 2007/0291303 A1* | 12/2007 | Tanaka | H04N 1/00204 358/1.15 |
| 2010/0159831 A1* | 6/2010 | Matsushima | G03B 7/00 455/41.2 |
| 2011/0103359 A1* | 5/2011 | Cho | H04N 7/148 370/338 |
| 2011/0145417 A1* | 6/2011 | Tamura | H04L 67/14 709/227 |

* cited by examiner

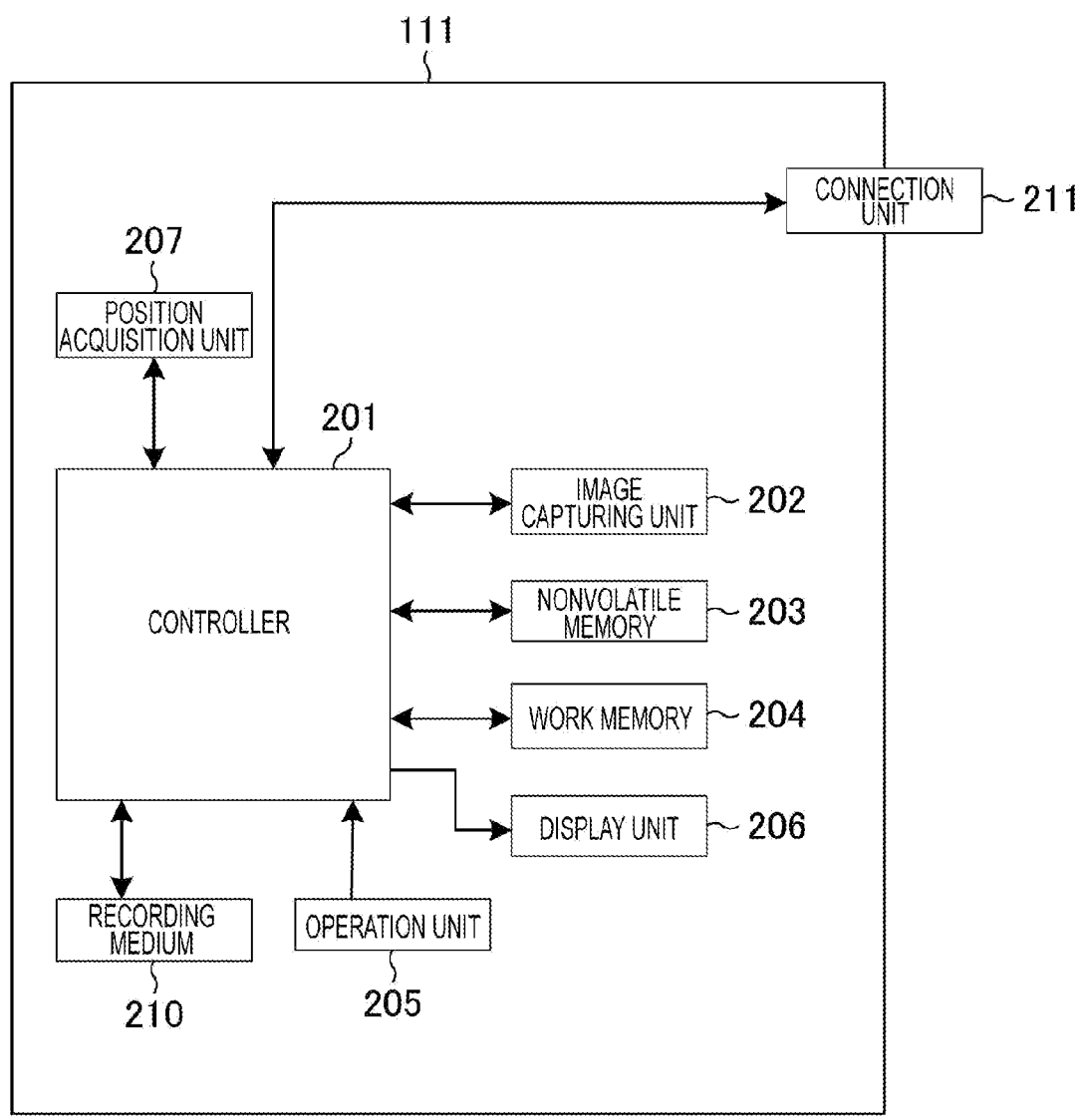

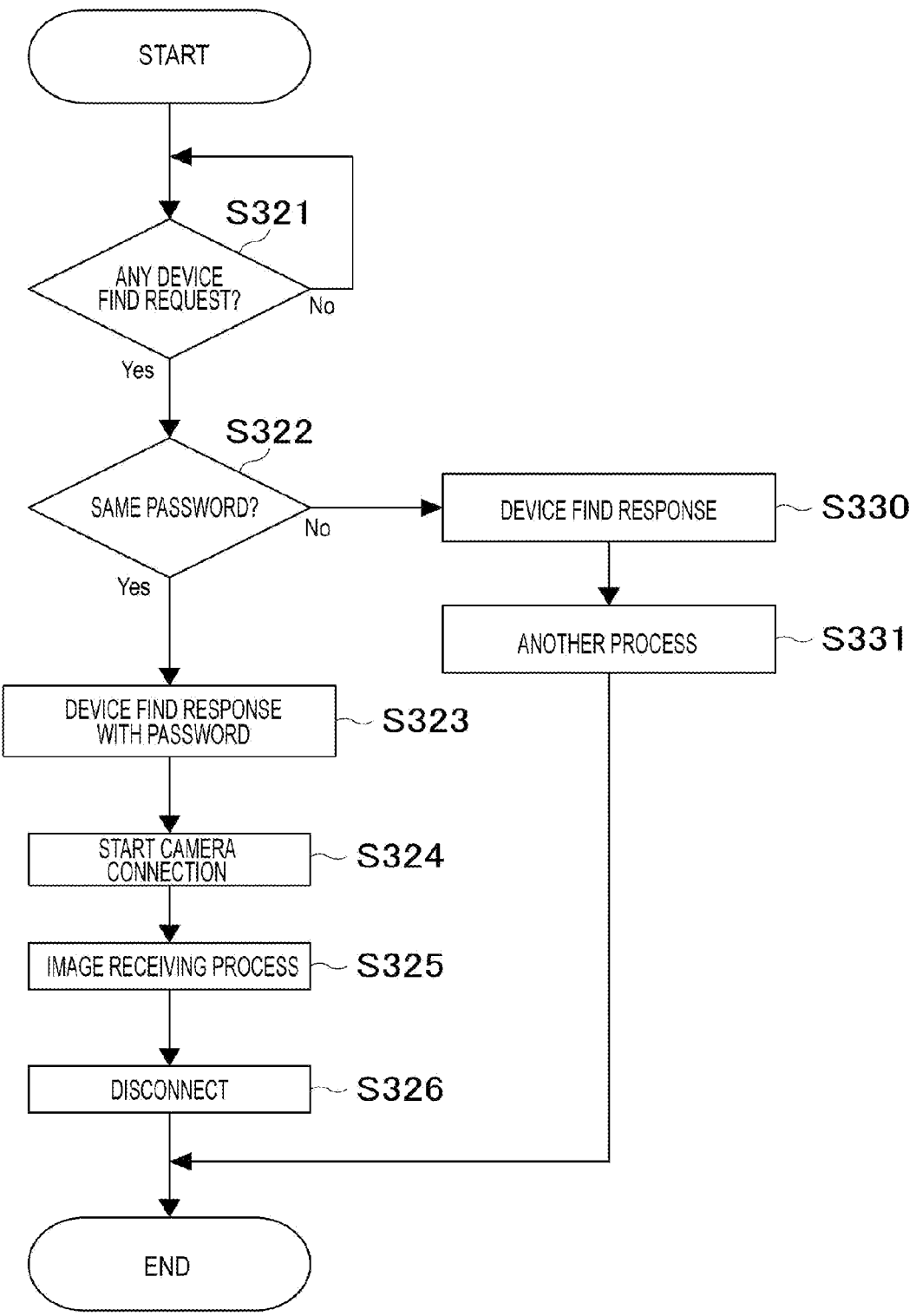

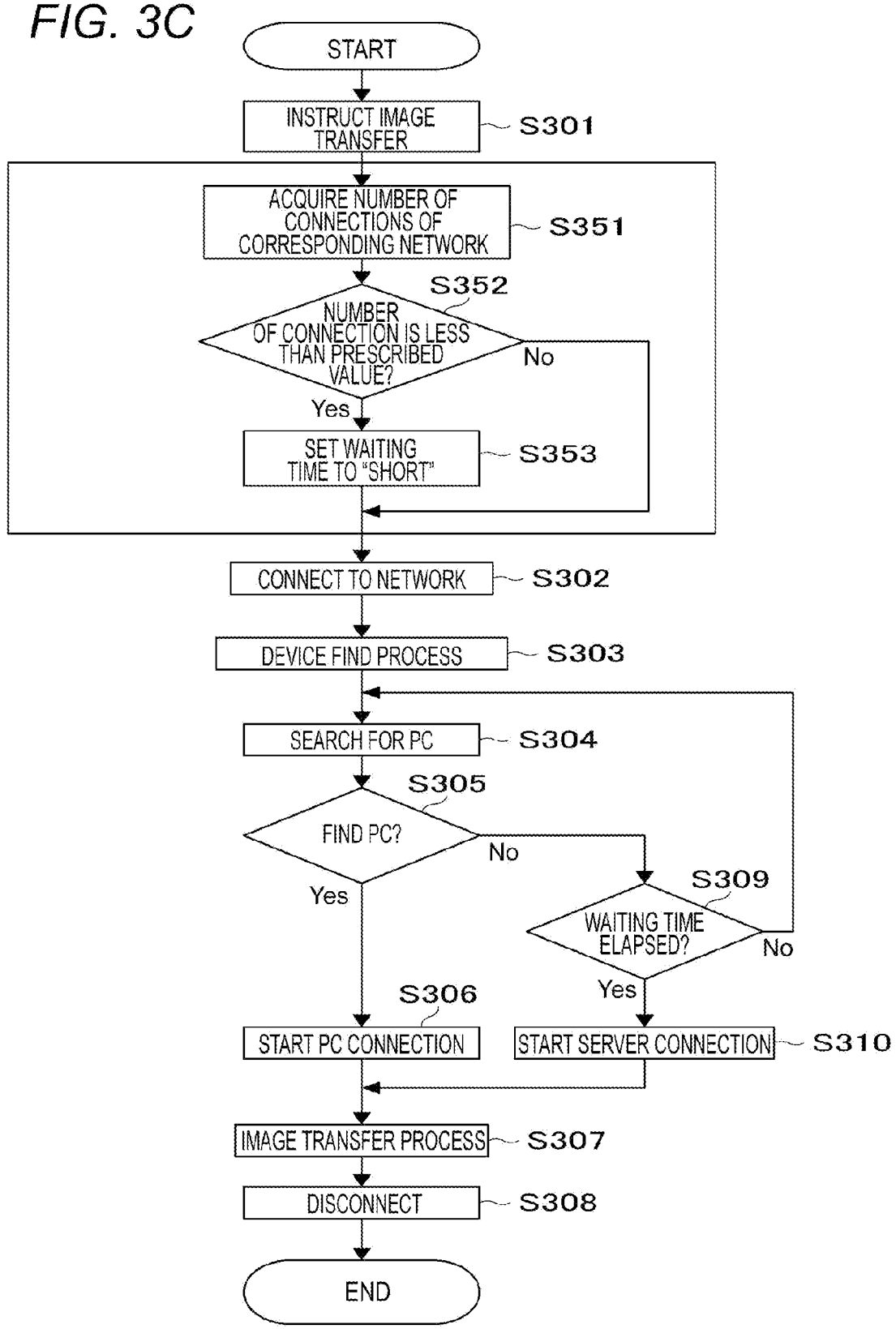

COMMUNICATION DEVICE FOR SEARCHING FOR PREDETERMINED EXTERNAL DEVICE FROM NETWORK, COMMUNICATION DEVICE CONTROL METHOD, AND RECORDING MEDIUM

BACKGROUND

Field

The present disclosure relates to a communication device and a communication device control method.

Description of the Related Art

There is an image sharing system in which digital content, such as image data or moving image data, saved in a digital camera having a wireless communication function is exchanged or shared with another device via the same network (for example, Japanese Patent Application Laid-Open No. 2011-118859).

Further, a system in which a plurality of devices shares content via a server on the Internet is also known (for example, Japanese Patent Application Laid-Open No. 2007-249821).

In general, a communication speed is higher in communications performed on the same network as disclosed in Japanese Patent Application Laid-Open No. 2011-118859, compared with communications via the Internet as disclosed in Japanese Patent Application Laid-Open No. 2007-249821. As such, in the case of transmitting data to a specific device from a communication device having both communication functions of performing communications on the same network and performing communications via the Internet, it is effective in giving preference to communications performed on the same network.

However, it is not always the case that a specific device exists on the same network. Especially, in a network of wireless communications, a certain period of time is needed to determine whether or not communications can be performed on the same network. As such, it is not always the case that wireless communications on the same network are able to be started immediately.

SUMMARY

In view of above, the aspects of the present disclosure appropriately control an execution time of a process of searching for a specific device in a communication device.

According to an aspect of the present invention, a communication device that participates in a network includes a storing control unit configured to store an image on a recording medium, a search unit configured to search for a predetermined external device from the network, a transmission unit configured to transmit an image stored on the recording medium to the predetermined external device via the network, a determination unit configured to determine frequency of participation in the network, and a changing unit configured to change a time for searching for the predetermined external device according to a determination result of the determination unit.

Further features of the present disclosure will become apparent from the following description of exemplary embodiments with reference to the attached drawings.

BRIEF DESCRIPTION OF THE DRAWINGS

FIG. 2A is a block diagram illustrating an exemplary configuration of a digital camera that is an example of a data processing device according to the first exemplary embodiment.

FIG. 3B is a flowchart illustrating a flow of processes performed by a PC at home according to the first exemplary embodiment.

FIG. 3C is a flowchart in which a process of determining whether a participated network is a home network or a network outside the home and changing the time waiting for a response from a PC at home is added to the processes performed by the digital camera according to the first exemplary embodiment.

DESCRIPTION OF THE EMBODIMENTS

Hereinafter, preferable exemplary embodiments of the present technology will be described in detail based on the accompanying drawings.

It should be noted that the exemplary embodiments described below are exemplary means for embodying the present technology, which may be modified or changed as appropriate according to the configuration or various conditions of a device to which the present technology is applied. Further, the respective exemplary embodiments may be combined as appropriate.

First Exemplary Embodiment

Figure 1:
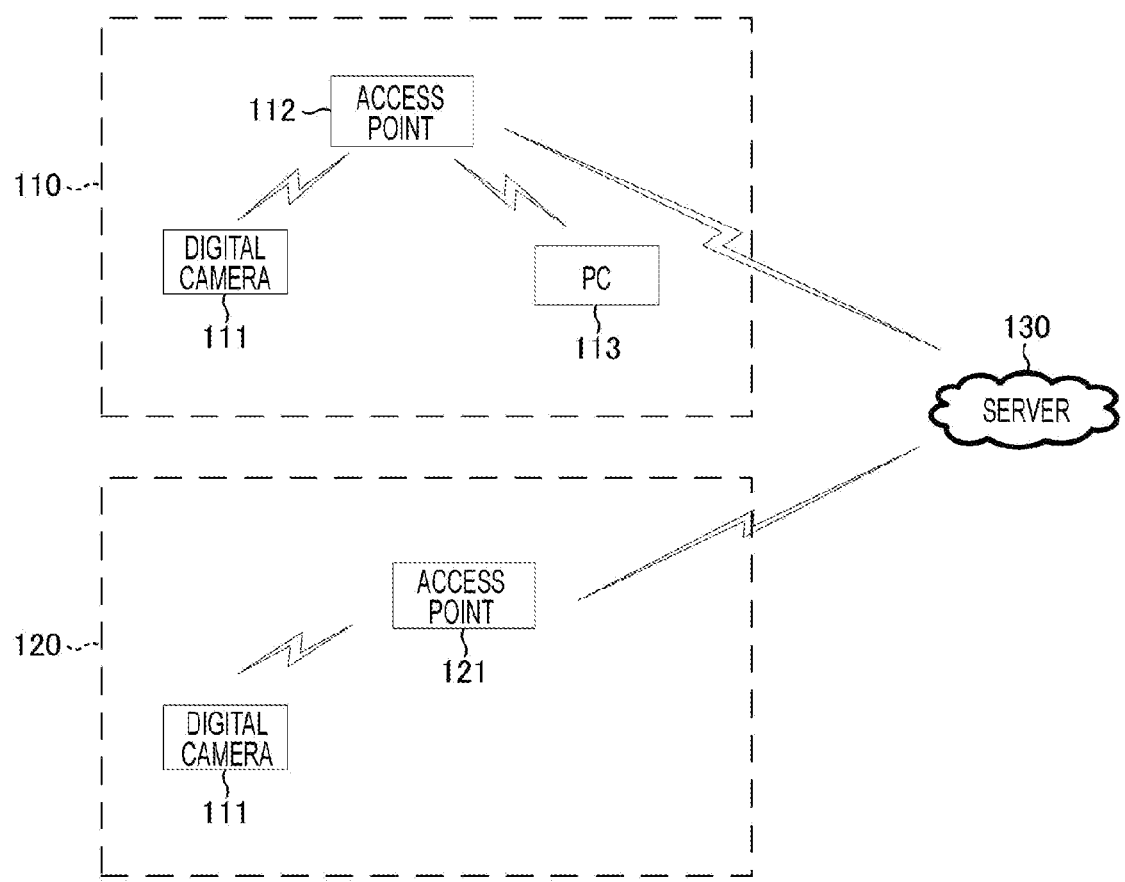
FIG. 1 is a diagram illustrating a wireless communication mode of transmitting an image in a digital camera having a wireless communication function to a PC at home according to a first exemplary embodiment.

FIG. 1 is a diagram illustrating a wireless communication mode of transmitting an image in a digital camera having a wireless communication function in the present embodiment, to a PC used as a data save terminal at home.

A network 110 shows a wireless communication mode at home.

A digital camera 111 participates, at home, in the network 110 constituted of an access point 112. In the network 110, a PC 113 has participated in the network 110. Digital camera 111 searches for the PC 113 in the network 110. The process of searching for the PC 113 will be described in more detail.

The digital camera 111 performs connection registration on the PC 113 in advance. More specifically, an image saving program is installed in the PC 113 and the program operates as a resident program. The image saving program issues a password to the digital camera 111. The password is stored in the digital camera 111. After participating in the network 110, the digital camera 111 broadcasts a device find command to the network. The device find command includes the password as a parameter.

A device in the network 110, which received the device find command, sends a response to the command. The PC 113 also sends a response of course. If the password issued by itself is included in the device find command, the PC 113 sends a response while including the same password as a parameter.

Upon receipt of the response including the password from the PC 113, the digital camera 111 finds the searching target, and the searching process ends. Then, the digital camera 111 begins a connection sequence with the PC 113 and establishes a connection.

When the connection has been established, the digital camera 111 transfers an image to the PC 113, and the PC 113 saves the image in a storage device of its own.

The PC 113 manages a list of images transferred from the digital camera 111, and the same image will not be transferred twice.

A network 120 shows a wireless communication mode outside the home.

The digital camera 111 participates in the network 120 constituted of an access point 121 outside the home. The digital camera 111 participating in the network 120 searches for the PC 113 in the same manner as that performed at home. As the PC 113 at home does not participate in the network 120, although a response is waited for a prescribed time, the search fails.

When the search fails, then an attempt is made to establish a connection with a server 130 via the access point 121.

The server 130 is registered in advance in order that the PC 113 at home exchanges image data with the outside. The PC 113 at home is connectable with the server 130 via the access point 112 at home. The image saving program installed in the PC 113 at home has registered the password in the server 130 in advance.

The server 130 determines that an image transferred along with the password is one to be transferred to the PC 113 at home, and temporarily saves it. The image saving program in the PC 113 at home periodically connects to the server 130 and checks whether or not there is a newly-arrived image, and if there is a newly-arrived image, downloads and stores the image in the own storage device. As the PC 113 and the server 130 exchange image lists with each other, the images held by the PC 113 will not be transferred from the digital camera 111 to the server 130.

The digital camera 111 connected to the server 130 transmits a stored password.

According to the received password, the server 130 determines the destination PC of the image, and temporarily saves the transferred image. Then, in response to an inquiry of a newly-arrived image from the PC 113 at home, the server 130 transmits the image, saved temporarily, to the PC 113 at home.

In this way, the digital camera 111 is able to save an image in the PC 113 at home via a server from outside the home.

(Configuration of Digital Camera)

FIG. 2A is a block diagram illustrating an exemplary configuration of the digital camera 111 which is an example of a data processing device of the present embodiment. It should be noted that while description will be given on a digital camera as an example of a data processing device, a data processing device is not limited to this. For example, a data processing device may be a portable media player, or a wireless terminal device such as a so-called tablet device or a personal computer.

A controller 201 controls respective units of the digital camera 111 in accordance with an input signal or a program described below. It is also acceptable that a plurality of units of hardware shares processes to thereby control the entire device, rather than the controller 201 controlling the entire device.

An image capturing unit 202 converts object light imaged by a lens included in the image capturing unit 202 into an electric signal, performs a noise reduction process, and outputs digital data as image data. The captured image data is stored in a buffer memory, and then applied with predetermined operation by the controller 201, and stored in a recording medium 210.

A nonvolatile memory 203 is an electrically erasable/writable nonvolatile memory in which a program and the like to be executed by the controller 201, described below, are stored.

A work memory 204 is used as a buffer memory that temporarily saves image data captured by the image capturing unit 202, a memory for image display of a display unit 206, a work area of the controller 201, and the like.

An operation unit 205 is used for accepting, from a user, an instruction to the digital camera 111 by the user. The operation unit 205 includes operation members such as a power button for instructing on/off of power supply of the digital camera 111 by a user, a release switch for instructing image capturing, and a reproduction button for instructing reproduction of image data. A touch panel formed on a display unit 206, described below, is also included in the operation unit 205.

It should be noted that the release switch includes SW1 and SW2. When the release switch is in a so-called half-depressed state, SW1 is on. Thereby, instructions for preparation for image capturing such as an AF (autofocus) process, an AE (auto exposure) process, an AWB (auto white balance) process, and an EF (pre-flashing) process are accepted. Further, when the release switch is in a so-called fully depressed state, SW2 is on. Thereby, an instruction for capturing an image is accepted.

The display unit 206 displays a view finder image for capturing an image, displays captured image data, displays text for interactive operation, and the like. It should be noted that the display unit 206 is not necessarily incorporated in the digital camera 111. It is only necessary that the digital camera 111 is connectable with the internal or external display unit 206 and has a display control function to control displaying of the display unit 206.

A position acquisition unit 207 performs a positioning process. The positioning process is a process of receiving a signal from a GPS satellite, and acquiring positional information indicating the position of the position acquisition unit 207 from the received signal. In the present embodiment, positional information is represented as a coordinate of latitude and longitude. The positional information is acquired periodically during the time when the power supply of the digital camera 111 is on, and is stored in the work memory 204. If the positional information has stored in the work memory 204, it is rewritten to newly acquired positional information. Through such a process, the latest positional information is always kept in the work memory 204. It should be noted that while an example of using GPS is described in the present embodiment, the position acquisition unit 207 is not limited to GPS. For example, the position acquisition unit 207 may be a device that acquires positional information from an external device such as a base station of a mobile phone. Further, an acceleration sensor or the like may be used in the positioning process.

A recording medium 210 is able to store image data output from the image capturing unit 202. The recording medium 210 may be configured to be detachable from the digital camera 111, or may be incorporated in the digital camera 111. This means that it is only necessary that the digital camera 111 has at least a means for accessing the recording medium 210.

A connection unit 211 is an interface for a connection with an external device. The digital camera 111 of the present embodiment is able to exchange data with an external device via the connection unit 211. It should be noted that in the present embodiment, the connection unit 211 includes an interface for performing communications with an external device via a wireless LAN. The controller 201 realizes wireless communications with an external device by controlling the connection unit 211. It should be noted that a communication method is not limited to a wireless LAN.

It should be noted that the digital camera 111 in the present embodiment is operable as a slave device in the infrastructure mode. When operated as a slave device, by connecting to an access point (hereinafter referred to as AP) around it, the digital camera 111 is able to participate in a network configured of the AP. Further, while the digital camera 111 in the present embodiment is a type of AP, it is also operable as an AP having a simple structure (hereinafter referred to as a simple AP) in which functions are further limited. It should be noted that an AP in the present embodiment is an example of a relay device.

When the digital camera 111 operates as a simple AP, the digital camera 111 forms a network by itself. A device around the digital camera 111 recognizes the digital camera 111 as an AP, and is able to participate in the network configured by the digital camera 111. As described above, it is assumed that a program for operating the digital camera 111 is held in the nonvolatile memory 203.

While the digital camera 111 in the present embodiment is one type of an AP, it is a simple AP not having a gateway function for transferring data received from a slave device to an Internet service provider or the like. As such, although the digital camera 111 is able to receive data from another device participating in the network configured by itself, it is unable to transfer the data to a network such as the Internet.

Description of the digital camera 111 is as given above. Next, a PC that receives an image transferred from the digital camera 111 and saves it in a storage device will be described.

(Configuration of PC)

Figure 2B:
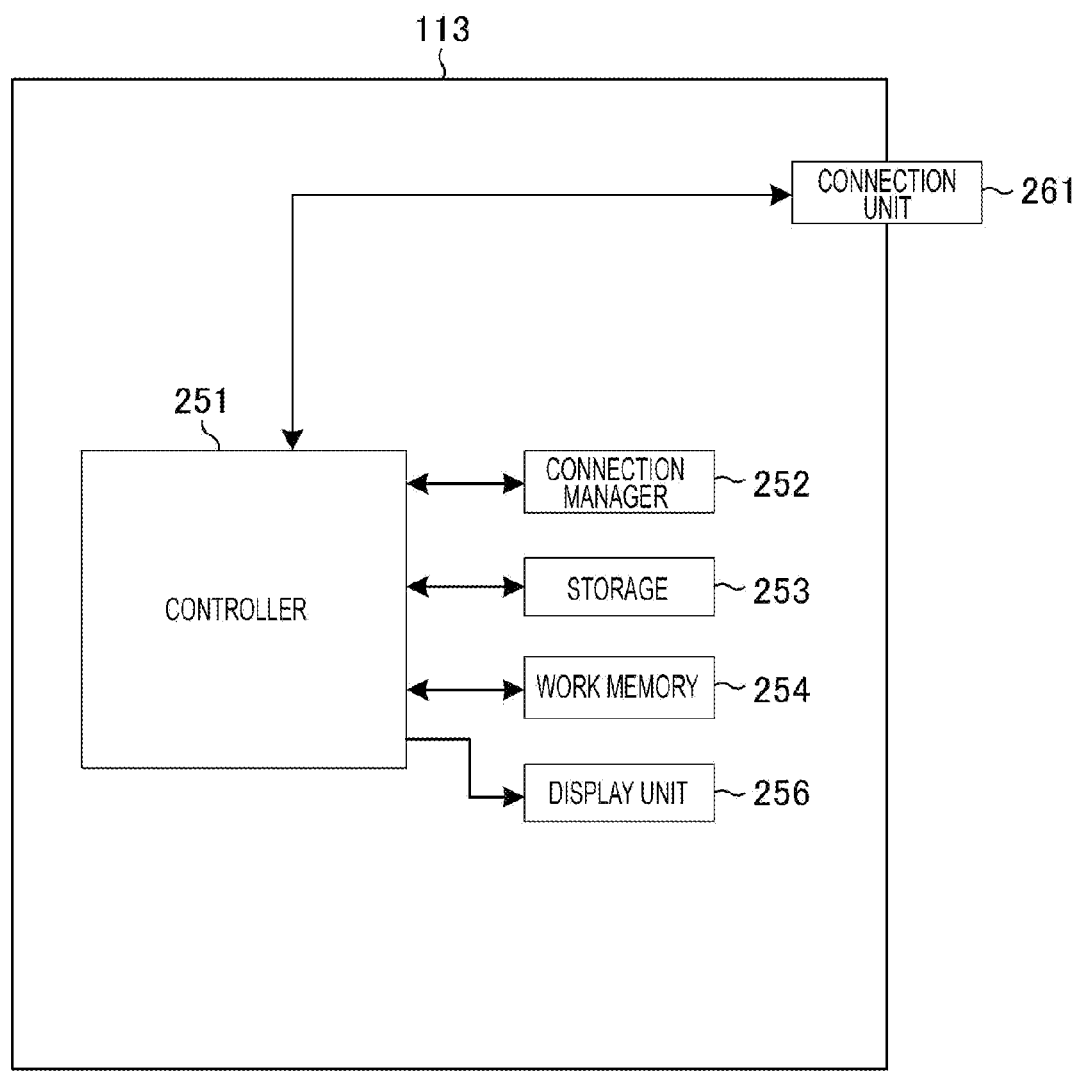
FIG. 2B is a block diagram illustrating an exemplary configuration of a PC that is an example of a data save terminal according to the first exemplary embodiment.

FIG. 2B is a block diagram illustrating an exemplary configuration of the PC 113 that is an example of a data save terminal of the present embodiment. Here, while description will be given on the PC 113 as an example of a data save terminal, a data save terminal is not limited to this. For example, a data save terminal may be an information processing device such as a storage device connectable with a network.

A controller 251 controls respective units of the PC 113 in accordance with an input signal or a program described below. It should be noted that it is also acceptable that a plurality of units of hardware shares processes to thereby control the entire device, rather than the controller 251 controlling the entire device.

A storage 253 is a hard disk or an electrically erasable/writable nonvolatile memory, which stores various types of programs and the like to be executed by the controller 251. A program for performing communications with the digital camera 111 is also stored in the storage 253. The program is assumed to be installed as a camera communication application.

It should be noted that a process performed by the PC 113 in the present embodiment is realized by reading a program supplied by a camera communication application. It is assumed that the camera communication application has a program for utilizing a basic function of the OS installed in the PC 113. Instead, the OS of the PC 113 may have a program for realizing a process performed in the present embodiment. Further, received image data is also saved in the storage 253 finally.

A work memory 254 is used as a buffer memory that temporarily saves received image data, a memory for image display of a display unit 256, a work area of the controller 251, or the like.

The display unit 256 displays image data, text for interactive operation, and the like. It should be noted that the display unit 256 is not necessarily incorporated in the PC 113. It is only necessary that the PC 113 is connectable with the display unit 256 and has a display control function to control displaying of the display unit 256.

A connection unit 261 is an interface for connecting with an external device. The PC 113 of the present embodiment is able to exchange data with an external device via the connection unit 261. It should be noted that in the present embodiment, the connection unit 261 includes an interface for performing communications with an external device via a wireless LAN.

The controller 251 realizes wireless communications with an external device by controlling the connection unit 261. It should be noted that the PC 113 in the present embodiment is operable as at least a slave device in the infrastructure mode, and is able to participate in a network configured of a neighboring AP.

The connection unit 261 receives an image from the digital camera 111 through the network in which the PC 113 participates. The received image is saved in the storage 253.

A connection manager 252 cooperates with the controller 251 to thereby manage an interface with an external device performed via the connection unit 261. It is also possible to allow the controller 251 to have a function as a connection manager, of course.

As the description has been given, using FIG. 1, on the wireless communication mode of transmitting an image in a digital camera having a wireless communication function to a PC at home in the present embodiment, at home, participation in a home network is made by connecting to the home access point 112. Then, by connecting to the PC 113 at home in the network, an image captured by the digital camera 111 can be transferred to and saved in the PC 113 at home.

At this time, the digital camera 111 searches for the PC 113 at home in the home network, and if the PC 113 at home is able to send a response immediately, a connection is completed. However, due to conditions such as the number of devices in the network, a load state of the PC 113 at home, a radio wave state of the wireless network, or the like, there is a case where searching for the PC 113 at home is not completed immediately.

As such, a certain waiting time from the start of searching until receipt of a response is set, in general. Even if a response is not made after a certain waiting time, re-searching operation is repeated several times. In this way, an attempt is made not to miss the PC 113 at home existing in the network.

Outside the home, by connecting to the access point 121 outside the home, it is possible to connect to the server 130, and transfer an image captured by the digital camera 111 to the PC 113 at home via the server 130 and save it.

As described above, the digital camera 111 changes a connection destination at home and outside the home. However, for the user, it is troublesome to change a connection destination at home and outside the home from time to time. As such, when participating in the network, the digital camera 111 first searches for the PC 113 at home, and if the PC 113 at home is not found, the digital camera 111 determines that the PC 113 at home is not on the network, and changes the connection destination to the server 130. In this way, the user is able to transfer an image without changing the connection destination of the digital camera 111 from time to time.

However, when participation in the network is made outside the home, searching for the PC 113 at home is performed first, and after a certain waiting time has elapsed, searching for the server 130 is started. As such, time taken for searching for the PC 113 at home must be waited. As such, if the waiting time for searching for the PC 113 at home is shortened, the waiting time outside the home is reduced. However, even at home, searching for the PC 113 at home may take time depending on the various conditions as described above, and searching may fail due to a short waiting time. As such, reckless reduction of the waiting time may result in an inefficient state, adversely.

In view of the above, the digital camera having a wireless communication function in the present embodiment is configured to presume whether it is at home or outside the home, and if it is presumed to be outside the home, reduce the time for searching for the PC 113 at home so as to enable the waiting time outside the home to be shorter. It should be noted that in the digital camera of the present embodiment, whether or not to use this function can be set arbitrary by a user though a menu operation or the like.

First, description will be given on the case of a setting not using this function.

Figure 3A:
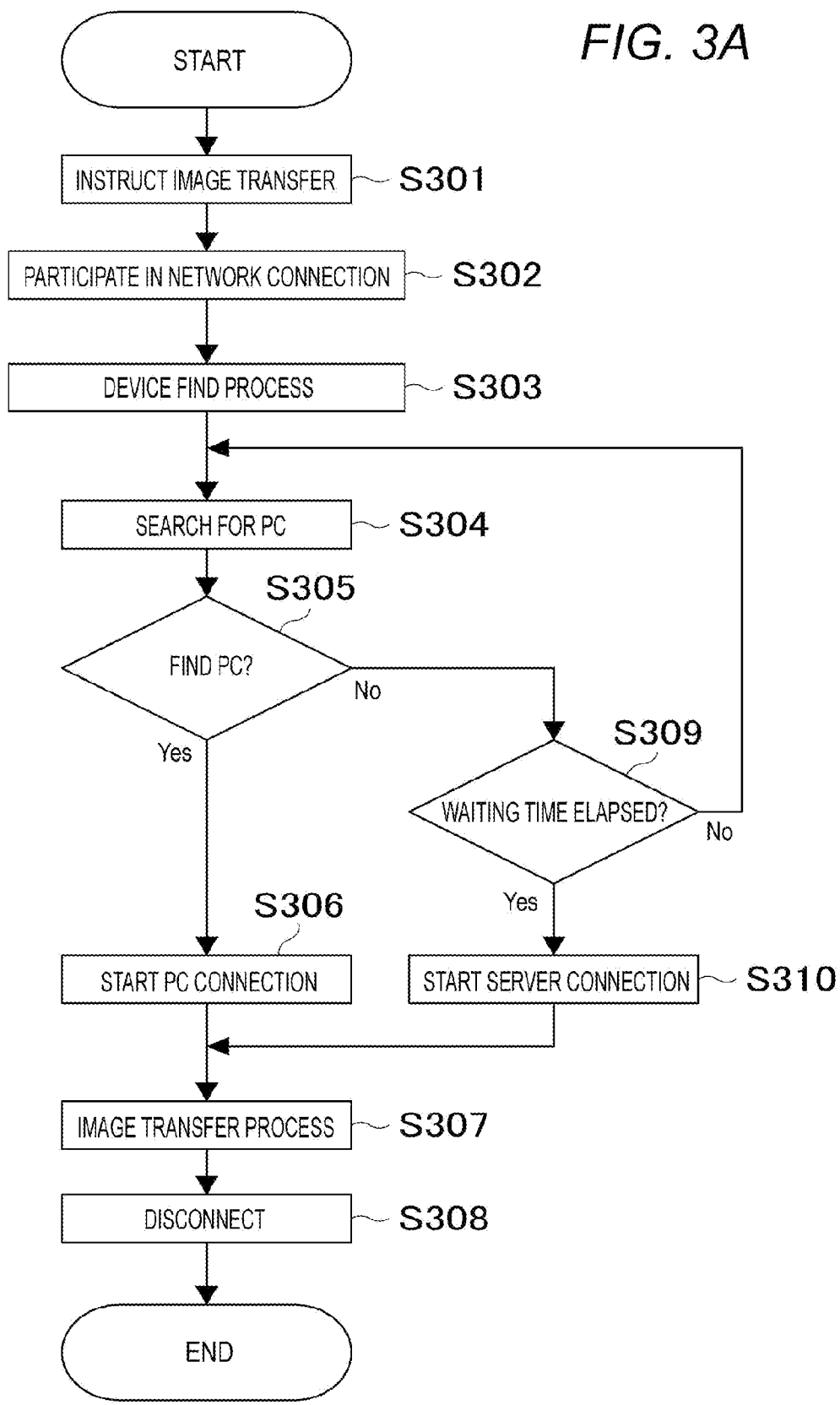
FIG. 3A is a flowchart illustrating a flow of processes performed by a digital camera according to the first exemplary embodiment.

FIG. 3A is a flowchart illustrating a flow of processes performed by the digital camera 111 in the present embodiment. The respective processes illustrated in this flowchart are realized, by the controller 201, by loading a program saved in the nonvolatile memory 203, developing it in the work memory 204, and controlling the respective units of the digital camera 111 according to the program. This also applies to the subsequent flowcharts illustrating processes performed by the digital camera 111. Further, the processes illustrated in this flowchart are started when the controller 201 determines that an instruction to back up an image stored in the recording medium 210 of the digital camera 111 is accepted.

The controller 201 receives an image transfer instruction from a user at S301.

At S302, the controller 201 participates in a network connection to which it is accessible.

At S303, the controller 201 issues a device find command in the participated network. At this time, a password having been issued from the PC 113 at home is included in the device find command as a parameter for all devices in the network.

At S304, the controller 201 performs PC search (device search) by collecting responses to the device find command.

At S305, the controller 201 determines whether or not any of the responses collected at S304 has the same password. If there is one having the same password, it means that the PC 113 at home is found. As such, at S306, a communication establishing process to connect to the PC 113 is performed. Upon completion of the PC connection, an image transfer process is performed at S307, and the image in the digital camera 111 is transferred to the PC 113 at home.

Upon completion of the transfer, a disconnection process is performed at S308.

At S305, if the controller 201 determines that there is no one having the same password, at S309, the controller 201 determines whether or not a predetermined waiting time has elapsed. If a predetermined waiting time has not elapsed, the controller 201 again collects responses to the device find command at S304.

At S305, the controller 201 determines whether or not there is one having the same password in the collected responses, and if there is one having the same password, the controller 201 performs the same processes as those performed from S306 described above, while if there is no one having the same password, the controller 201 again determines whether the waiting time has elapsed at S309.

At S309, if it is determined that a predetermined waiting time has elapsed, at S310, the controller 201 begins a communication establishing process to connect to the server 130. The controller 201 issues a device find command to the outside network via the access point 121. A password having been issued from the PC 113 at home is included in the device find command as a parameter for all devices in the network.

When a response including the password from the server 130 is received, a connection with the server 130 is established. Upon completion of the connection with the server 130, an image transfer process is performed at S307, and the image in the digital camera 111 is transferred to the server 130.

Then, in response to an inquiry of a newly arrived image from the PC 113 at home, the server 130 transmits a temporarily saved image to the PC 113 at home, whereby the image in the digital camera is transferred to the PC 113 at home via the server 130.

FIG. 3B is a flowchart illustrating a flow of processes performed by the PC 113 at home in the present embodiment.

At S321, the controller 251 monitors whether or not there is a device find request via the connection unit 261.

When determining that there is a device find request matching its condition, at S322, the controller 251 determines whether or not the device find request includes the password issued by itself. If the device find request does not include the password issued by itself, as it is necessary to return a general response which does not need a particular process, the controller 251 sends a device find response not including the password at S330. Then, at S331, the controller 251 performs a connection process with a counter device if necessary, and after the connection, performs data exchange with the counter device.

At S322, if the controller 251 determines that the device find request includes the password issued by itself, the controller 251 returns a device find response including the password at S323.

After the device find response including the password is sent, a connection request is made by the camera that issued the device find request. As such, the controller 251 performs a connection process with the camera at S324 to thereby establish a connection.

When the connection is established, as an image is transmitted from the camera, the controller 251 receives the image from the camera at S325.

After receiving all images, the controller 251 disconnects the connection with the camera at S326.

Next, description will be given on the case of a setting using the function.

FIG. 3C is a flowchart in which a changing process is added to the flowchart illustrating the flow of processes performed by the digital camera 111 described in FIG. 3A. The changing process includes determining whether the participated network is a home network or a network outside the home, and changing the time waiting for a response from the PC at home. The processes illustrated in this flowchart are started by determining, by the controller 201, that an instruction for backing up an image stored in the recording medium 210 of the digital camera 111 is accepted.

The controller 201 receives an image transfer instruction from a user at S301.

Figure 4:
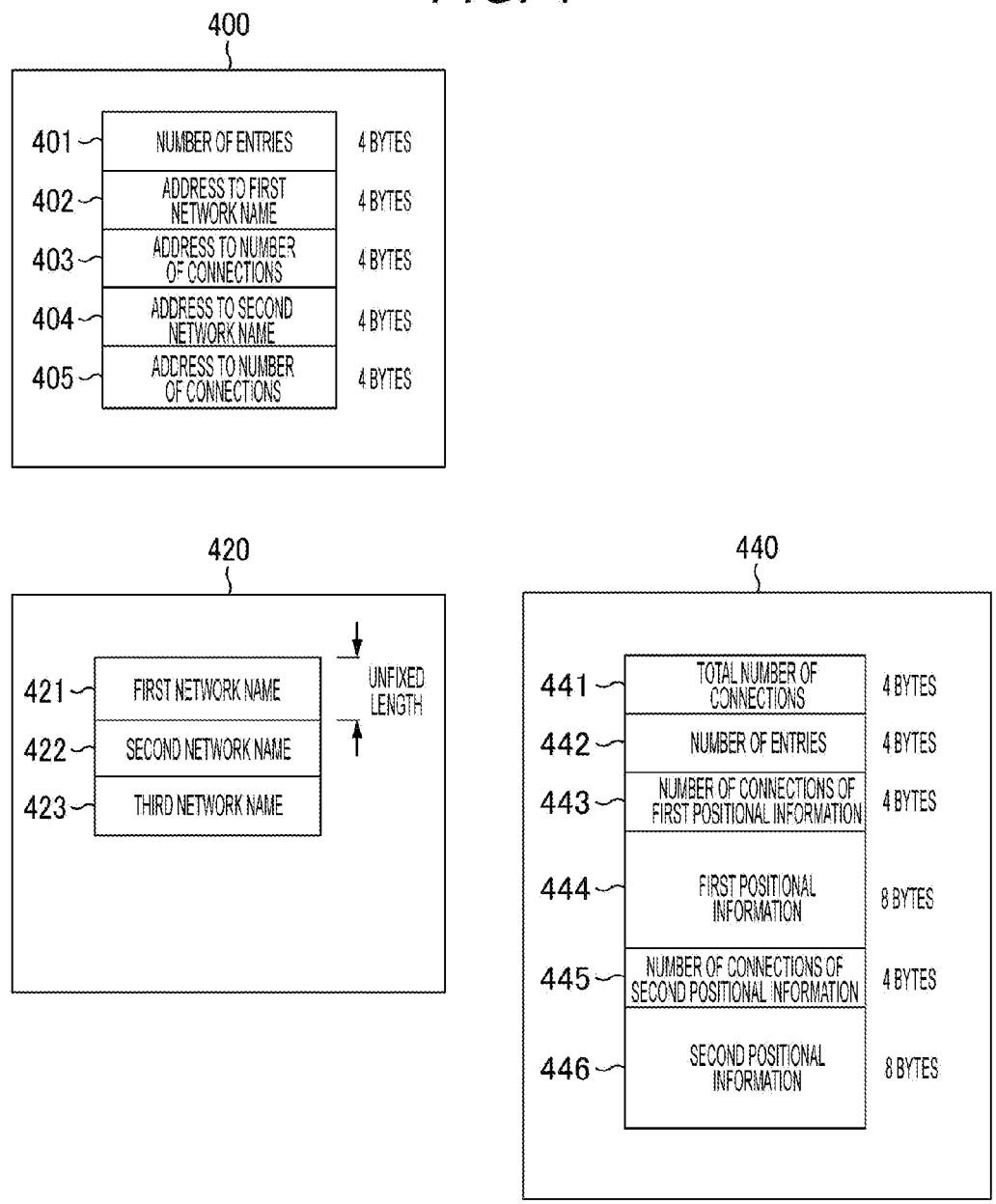
FIG. 4 is a diagram illustrating an exemplary data structure for storing the number of connections by each network to which a digital camera is connected according to the first exemplary embodiment.

At S351, the controller 201 obtains the number of connections of a network in which the controller 201 attempts to participate. The number of connections of the network is stored in the recording medium 210 of the digital camera 111 in a data structure as illustrated in FIG. 4 described below. Further, the number of connections is updated by a process such as counting up each time a connection to the network is established. This means that the number of connections established in the past is stored for each network. It should be noted that the location to be stored may be the nonvolatile memory 203.

At S352, the controller 201 compares the number of connections obtained at S351 with a prescribed value. In general, the number of connections to the home network is larger than the number of connections to a network outside the home. As such, network identification is able to be performed in such manner that if the number of connections to the network is less than the prescribed value set properly, it is identified that the user is outside the home and the network in which the user is attempting to participate is a network outside the home.

Accordingly, even if the PC at home is searched for in the network, it is less likely that the PC at home is found, whereby it is considered that the user is not attempting to connect to the PC 113 at home but attempting to connect to the server 130. In that case, it is highly convenient to stop searching for the PC 113 at home early and switch to searching for the server 130.

At S352, as a result of comparing the number of connections obtained at S351 with the prescribed value, if it is determined that the number of connections is less than the prescribed value, the controller 201 performs a setting such that a waiting time for a response from the PC 113 at home becomes shorter than usual at S353.

Subsequently, the processes are performed in the same sequence as that of FIG. 3A.

As a waiting time for a response of the PC 113 at home is set to be shorter than usual, although PC search is performed at S304 and a response from the PC 113 at home is checked at S305, it is likely that the PC 113 at home is not found and that a lapse of the waiting time is determined at S309. As the waiting time is shorter than usual, the process of S310 is performed with a waiting time shorter than usual and a connection is established with the server 130. It should be noted that as the number of connections is increased without fail, the number of connections to a network outside the home may eventually exceed the prescribed value. As such, if there are a plurality of networks exceeding the prescribed value, it is also acceptable to shorten the waiting time if the network in which an attempt to participate is made is a network having the largest number of connections.

Further, in the case of a newly purchased camera, not only the number of connections to a network outside the home but also the number of connections to the home network may not exceed the prescribed value. As such, the waiting time may be determined on the condition that the number of connections is the largest, rather than the conditions of both the prescribed value and the number of connections being large. Further, it is also possible to store not only the number of connections but also information of the time when a connection was made by each network, and add a condition of whether or not a connection was established recently.

FIG. 4 is a data structure diagram for storing the number of connections by each connected network. The data structure includes three tables.

An entry table 400 is the main table, from among the three tables illustrated, for data accessing. However, data can be accessed via network name table 420 and connection frequency table 440 as needed.

In the entry table 400, the first four bytes show the number of data entries handled in this data structure, which is the number of networks to which connections were established. This is referred to as the number of entries 401.

A data entry includes a four-byte address to a network name and a four-byte address to the number of connections.

An address 402 is an address to a first network name, and an address 403 is an address to the number of connections to the first network. Similarly, an address 404 is an address to a second network name, and an address 405 is an address to the number of connections to the second network. Data entries continue for the number of networks connected.

An access to the $N^{th}$ data entry can be made by offsetting four bytes of the number of entries 401, and accessing the data located at eight times as large as N bytes ahead.

A network name table 420 is a table saving the network names to which connections were made.

A first network name 421 stores a network name in character string data. As the length of a network name is arbitrary, the data length of a network name differs by the entry.

Similarly, a second network name 422 stores the second network name, and a third network name 423 stores the third network name. The number of stored network names is the number of entries 401.

Each network name is referred to from the address to the network name which is a member of the entry table 400.

A connection frequency table 440 is a table saving the number of connections by each network. One table corresponds to one data entry of the entry table 400, and as the connection frequency table 440, there are similar tables for the number of networks.

The total number of connections 441 shows the number of connections made to the network shown by one data entry of the entry table 400. The total number of connections 441 is referred to from an address to the number of connections which is a member of the entry table 400.

Further, although description is omitted, each time a connection is made to a network, the number of connections of the network is incremented. Accordingly, as for a network connected for the first time, a new entry is added to the entry table 400 of FIG. 4, a new network name is added to the end of the network name table 420, and a new connection frequency table 440 is created.

As described above, the network names to which connections were made and the number of connections made to the networks are stored by the data group having the structure as illustrated in FIG. 4, and are used for acquisition of the number of connections at S351 of FIG. 3C.

At S352, determination of the number of connections is performed to thereby presume whether it is at home or outside the home, and the waiting time is set at S353.

Second Exemplary Embodiment

Hereinafter, description will be given on a wireless camera according to a second exemplary embodiment of the present technology with reference to FIG. 4. The wireless camera enables the time, taken until a connection is completed, to be shorten by reducing the time taken for PC search when connecting to a server outside the home.

In the first exemplary embodiment, the controller 201 stores the number of connections by each connected network, and according to the number of connections, the controller 201 presumes whether the connecting location is home or outside the home to thereby change the time for waiting for a response from a PC at home.

In the second exemplary embodiment, the controller 201 performs a positional information acquisition process when a connection to a network is established, stores the acquired positional information in a storage medium (for example, the nonvolatile memory 203) by each network, and uses the positional information for determining whether the location is home or outside the home.

Recently, there is a small-sized portable access point by which a network connectable with a wireless device can be formed regardless of the place. Such a small-sized access point is connectable to an outside network such as the Internet using a public network. As such, a wireless camera of the present embodiment is able to connect to an outside network such as the Internet using a public network by participating in a wireless network of a small-sized access point.

As such, a user frequently uses own small-sized access point to connect to a network outside the home. As a result, the number of connections to the network of the small-sized access point is increased. In that case, although it is presumed to be a home network because of a large number of connections, as accessing is performed outside the home, a response from the PC 113 at home is waited for a usual waiting time even in the network where the PC 113 at home does not exist. As such, a longer time is taken for connection to the server 130.

The connection frequency table 440 of FIG. 4 is a table storing the number of connections of each network, as described in the first exemplary embodiment. In the first exemplary embodiment, only the total number of connections 441 is used.

In the second exemplary embodiment, when a connection to a network is established, if the network name is the same, the number of connections is incremented in the connection frequency table 440 corresponding to the network. However, the number of connections is stored by being segmented according to the positional information when the connection is established.

The number of entries 442 shows the number of pieces of positional information when a connection to the same network is established. For each entry, the number of connections by each piece of positional information and the positional information thereof are saved in a pair.

The number of connections 443 of first positional information is the number of connections of the first entry, and first positional information 444 is positional information itself of the first entry.

The number of connections 445 of second positional information is the number of connections of the second entry, and second positional information 446 is positional information itself of the second entry.

In a similar manner, the number of connections and positional information are saved continuously for the number of entries. The sum of the numbers of connections of all of the entries is the total number of connections 441.

The data length of the number of connections of each entry is four bytes, and the data length of positional information is eight bytes.

As such, each entry has twelve bytes. The number of entries at the fourth bytes from the top of the connection frequency table 440 is obtained, and from a location of four-byte ahead, data of each entry is stored in twelve bytes. Thereby, from the entry table 400 for data accessing, the address 403 to the number of connections or the like is obtained. Then, if it is possible to refer to the connection frequency table 440 of the corresponding network, it is possible to obtain the positional information when a connection to the network is established and the number of connections by each piece of positional information.

In the present embodiment, as the positional information itself, positional information acquired by the position acquisition unit 207 of the digital camera 111 is used. If GPS is installed in the small-sized access point, information thereof may be used. Alternatively, a configuration of acquiring positional information from a wireless access point around it may also be acceptable. If positional information is not able to be acquired, the number of connections is recorded as position unknown.

As resolution of positional information, positional information of not larger than the prescribed value is handled as the same position.

In this way, each time a connection to a network is made, positional information thereof and the number of connections at the connecting position of the connected network are stored.

The controller 201 performs a positional information acquisition process to acquire positional information of that time when a connection to a network is established, and based on the network name of the participated network, it is checked whether the network was connected from the same location before. If the network was not connected, or the number of connections from that location is less than a prescribed value, the controller 201 performs a setting to shorten the waiting time for a response from the PC 113 at home. Meanwhile, if it is determined that participation was made to the participated network in the past, it is checked whether the locations from which participation was made are not a certain location but the locations differ. If the locations differ, it is determined that it is at least not a fixed access point. As such, it is determined that a connection is made to a small-sized portable access point. Even in that case, the waiting time is set to be shorter.

In this way, even in the case of using a small-sized access point in which the total number of connections is large, it is determined that the network is not a home network. This makes it possible to connect to a server in a shorter waiting time for a response from the PC at home outside the home.

While preferable exemplary embodiments of the present technology have been described above, the present technology is not limited to these exemplary embodiments, and various types of variations and changes can be made within the scope of the gist of the present technology.

Other Exemplary Embodiments

It should be noted that in the exemplary embodiments described above, use of a function capable of taking backup of an image in a PC at home via a server has been described as an example. However, as a method of accessing a PC at home, it is also possible to simply establish a wireless LAN connection to a PC at home via an access point at home. In a digital camera 111 having such a function, it is expected that a function for image backup and a function for transmitting and receiving an image between a PC and a camera via a wireless LAN are installed independently. As such, in the function for transmitting and receiving an image between a PC and a camera via a wireless LAN, using a path like a bypass to take backup via a server is less likely to be expected. As such, when a user instructs to establish a wireless LAN connection to a PC at home via an access point at home rather than an instruction for image backup, it is acceptable to increase the waiting time so as to give priority to establishment of a connection securely. In that case, the waiting time may be set to be the same as the time determined at S309 or longer. Further, it is also possible not to determine the frequency of participation in the network.

Further, the present technology is also realized by performing the processes described below. That is, software (computer program) that realizes functions of the exemplary embodiments described above is supplied to a system or an apparatus via a network or a various types of computer readable storage media. Then, the computer (or CPU, MPU, or the like) of the system or the apparatus reads the program and executes it.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-123607, filed Jun. 16, 2014, which is hereby incorporated by reference herein in its entirety.

What is claimed is:

1. A communication device that participates in a network, the communication device comprising:
   a memory for storing data and a computer program; and
   a processor coupled to the memory for executing the computer program, the computer program comprising instructions for:
   storing an image on a recording medium;
   searching for a predetermined external device from the network after participating in the network;
   transmitting an image stored on the recording medium to the predetermined external device via the network;
   determining a number of times of participation in the network,
   wherein a time period for searching for the predetermined external device in the network is changed according to a determination result; and
   a first mode and a second mode, wherein in the first mode the image is transmitted to another predetermined external device via the network in a case that the predetermined external device is not found, wherein in the second mode a search for the predetermined external device is terminated without communicating with the another predetermined external device in the case that the predetermined external device is not found, and wherein the time period for searching for the predetermined external device in the second mode is longer than the time period for searching for the predetermined external device in the first mode.

2. The communication device according to claim 1, wherein
   when the number of times of participation in the network is less than a predetermined number, the time period for searching for the predetermined external device is shortened.

3. The communication device according to claim 1, wherein
   when the number of times of participation in the network is less than a number of times of participation in any other networks, the time period for searching for the predetermined external device is shortened, and
   when the number of times of participation in the network is greater than a number of times of participation in any other networks, the time period for searching for the predetermined external device is not shortened.

4. The communication device according to claim 1, wherein
   in a case that the predetermined external device is not found, the transmission unit transmits the image to a predetermined external device other than the predetermined external device via the network.

5. The communication device according to claim 1, wherein the number of times of participation is stored in a storage unit based on identification information associated with the network.

6. A communication device that participates in a network, the communication device comprising:
   a memory for storing data and a computer program; and
   a processor coupled to the memory for executing the computer program, the computer program comprising instructions for:
   searching for a predetermined external device from the network after participating in the network and communicating with a found predetermined external device;
   changing a time period for searching for the predetermined external device based on a number of times of participation in the network; and
   a first mode and a second mode, wherein in the first mode the image is transmitted to another predetermined external device via the network in a case that the predetermined external device is not found, wherein in the second mode a search for the predetermined external device is terminated without communicating with the another predetermined external device in the case that the predetermined external device is not found, and wherein the time period for searching for the predetermined external device in the second mode is longer than the time period for searching for the predetermined external device in the first mode.

7. The communication device according to claim 6, wherein the computer program further comprises an instruction for:
in a case that the predetermined external device is not found, communicating with another predetermined external device via the network.

8. A method of controlling a communication device that participates in a network, the method comprising:
storing an image;
searching for a predetermined external device from the network after participating in the network;
transmitting a stored image to the predetermined external device via the network;
determining a number of times of participation in the participated network; and
changing a time period for searching for the predetermined external device according to a result of determining the number of participation,
wherein in a first mode the image is transmitted to another predetermined external device via the network in a case that the predetermined external device is not found, wherein in a second mode a search for the predetermined external device is terminated without communicating with the another predetermined external device in the case that the predetermined external device is not found, and wherein the time period for searching for the predetermined external device in the second mode is longer than the time period for searching for the predetermined external device in the first mode.

9. A method of controlling a communication device that participates in a network, the method comprising:
searching for a predetermined external device from the network after participating in the network;
communicating with a found predetermined external device; and
changing a time period for searching for the predetermined external device, based on a number of times of participation in the network,
wherein in a first mode the image is transmitted to another predetermined external device via the network in a case that the predetermined external device is not found, wherein in a second mode a search for the predetermined external device is terminated without communicating with the another predetermined external device in the case that the predetermined external device is not found, and wherein the time period for searching for the predetermined external device in the second mode is longer than the time period for searching for the predetermined external device in the first mode.

10. A non-transitory computer-readable storage medium storing computer executable instructions causing a computer to execute a method for controlling
a communication device, the method comprising:
a communication device, the method comprising:
storing an image;
searching for a predetermined external device from the network after participating in the network;
transmitting a stored image to the predetermined external device via the network;
determining a number of times of participation in the participated network; and
changing a time period for searching for the predetermined external device according to a result of determining the number of times of participation,
wherein in a first mode the image is transmitted to another predetermined external device via the network in a case that the predetermined external device is not found, wherein in a second mode a search for the predetermined external device is terminated without communicating with the another predetermined external device in the case that the predetermined external device is not found, and wherein the time period for searching for the predetermined external device in the second mode is longer than the time period for searching for the predetermined external device in the first mode.

11. A non-transitory computer-readable storage medium storing computer executable instructions for causing a computer to execute a method for controlling a communication device, the method comprising:
searching for a predetermined external device from the network after participating in the network;
communicating with a found predetermined external device; and
changing a time period for searching for the predetermined external device, based on a number of times of participation in the network,
wherein in a first mode the image is transmitted to another predetermined external device via the network in a case that the predetermined external device is not found, wherein in a second mode a search for the predetermined external device is terminated without communicating with the another predetermined external device in the case that the predetermined external device is not found, and wherein the time period for searching for the predetermined external device in the second mode is longer than the time period for searching for the predetermined external device in the first mode.

* * * * *